United States Patent [19]
Goodell et al.

[11] Patent Number: 4,730,656
[45] Date of Patent: Mar. 15, 1988

[54] VEHICLE WHEEL END ASSEMBLY

[75] Inventors: Fred L. Goodell, Grosse Ile; Michael J. Ellison, Canton, both of Mich.

[73] Assignee: AM General Corporation, South Bend, Ind.

[21] Appl. No.: 752,576

[22] Filed: Jul. 8, 1985

[51] Int. Cl.[4] ............................................. B60C 23/00
[52] U.S. Cl. ..................................... 152/417; 137/224; 137/351; 277/59; 277/153; 277/179; 384/449; 384/544; 384/589
[58] Field of Search ............... 192/417, 416, 415, 427, 192/429; 285/110, 190; 137/224, 351; 301/5 VH, 124 R, 124 H, 131, 105 R; 141/46; 384/44, 46, 466, 475, 484, 486, 544, 589, 449; 277/11, 58, 59, 153, 179

[56] References Cited
U.S. PATENT DOCUMENTS

| | | | |
|---|---|---|---|
| 4,015,883 | 4/1977 | Taylor | 384/484 |
| 4,431,043 | 2/1984 | Goodell et al. | 152/417 |
| 4,498,709 | 2/1985 | Wells et al. | 152/417 X |
| 4,605,319 | 8/1986 | Korenhof | 384/484 |

Primary Examiner—Jerome Massie
Assistant Examiner—Thomas Bokan
Attorney, Agent, or Firm—Brooks & Kushman

[57] ABSTRACT

A vehicle wheel end assembly (10) is adaptable for use with an on-board central tire inflation system. The assembly provides a passage for the routing of air between the on-board system and the vehicle tire. The assembly comprises a stationary spindle (12) and a rotational hub (14) mounted thereon. The hub is supported for rotation by first and second axially spaced bearing sets (16, 18), each having an inner race (20, 26) and an outer race (22, 28) associated with the spindle and hub, respectively. The inner race of the inboard bearing set (18) is formed with an axial air pressure (46) which communicates with an internal chamber (36) in the hub to form a portion of the air passage between the tire and on-board system. In another feature, rotary seals (60, 62) are seated in opposed faces of the bearing sets and include sealing lips (72) which have a sealed contact with the upper surface of the inner bearing races. An inboard spindle collar (100) may also be employed to facilitate the continuation of the air passage (98) in the bearing race (90) to the on-board system.

27 Claims, 5 Drawing Figures

VEHICLE WHEEL END ASSEMBLY

TECHNICAL FIELD

This invention relates to central tire inflation systems, and, more particularly, to a wheel end assembly adapted for use with such a system.

BACKGROUND ART

The present invention presents an alternative design to the vehicle wheel end assembly disclosed in co-pending application Ser. No. 712,420, filed Mar. 18, 1985 and assigned to the assignee of the present invention.

In the co-pending application it was recognized that one of the important design considerations inherent in a central tire inflation system is the need for a reliable seal in the wheel assembly between rotating and non-rotating members. This design consideration is addressed by the present invention in a manner which requires minimal necessary modifications of the major components, i.e., spindle and hub, of the wheel end.

DISCLOSURE OF THE INVENTION

The present invention provides a wheel end assembly for a central tire inflation system which features modification of the wheel bearings to achieve a reliable sealed air passage between the rotational and non-rotational members of the assembly.

In broad terms the wheel end assembly of the present invention comprises a spindle or axle housing which is non-rotational and attached to the vehicle chassis. A hub is mounted concentrically on the spindle for rotation thereon. The hub is formed with an internal chamber which represents a portion of the overall air passage between the on-board inflation system and the respective pneumatic tire mounted on the wheel.

The hub is supported for rotation on the spindle by first and second axially spaced bearing sets. Each bearing set has a non-rotational inner race associated with the spindle and a rotational outer race associated with the hub. The inner race of the inboard bearing set is formed with an axial air passage which communicates with the internal chamber in the hub to provide an inboard continuation of the overall air passage.

In another feature of the invention, the rotary sealing between the rotational hub and the non-rotational spindle is accomplished by a pair of annular rotary seals mounted on the respective inboard and outboard bearing sets. More specifically, each annular seal includes a flange portion which seats in a notch formed in the face of the outer race. An integral lip extends radially inward and into sealing contact with the upper surface of the inner race. The seal flanges are secured in their notched seats by cooperation of the hub.

In an alternate embodiment of the invention, an inboard collar may be mounted on the spindle to facilitate coupling of the air passage formed in the inner race of the inboard bearing set with the on-board system.

Other features and advantages of the invention will become apparent in connection with the following detailed description.

BEST MODE FOR CARRYING OUT THE INVENTION

Figure 1:
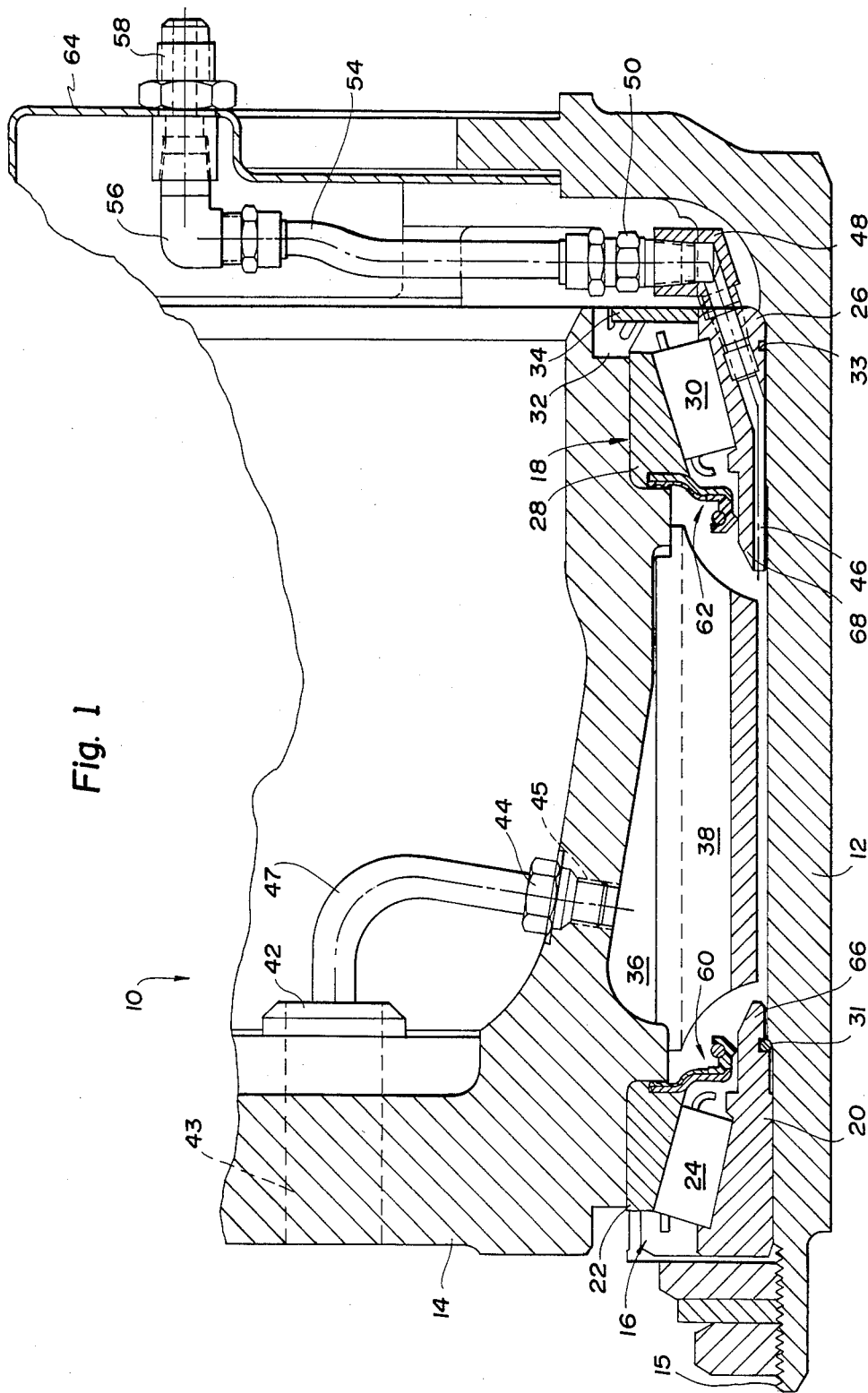
FIG. 1 is a side sectional view of the relevant portion of a vehicle wheel end assembly in accordance with the present invention.

FIG. 1 illustrates the portion of a vehicle wheel end assembly 10 relevant to an understanding of the present invention. The assembly 10 is suited for use with an on-board automated system for controlling tire pressurization. A wheel end assembly of similar function is disclosed in co-pending application Ser. No. 712,420, filed Mar. 18, 1985 and assigned to the assignee of the present invention.

The wheel end assembly 10 includes a spindle of axle housing 12 which is mounted in fixed relation to the vehicle chassis. A hub 14 is mounted for rotation on the spindle 12. The hub 14 is driven in a conventional manner by an axle shaft and drive flange (not shown but understood in the art).

The hub 14 is supported for rotation on the spindle 12 by an outboard bearing set 16 and an inboard bearing set 18. The bearing set 16 includes an inner race 20 mounted on the spindle 12. An outer race 22 is mounted on the hub 14 and is co-rotational with the hub. A representative tapered roller bearing 24 is disposed between the inner race 20 and the outer race 22.

The bearing set 18 similarly includes an inner race 26 associated with the spindle 12 and an outer race 28 which is co-rotational with the hub 14. A representative tapered roller bearing is shown at 30.

The inner races 20 and 26 each have formed in them grooves to receive respective O-rings 31 and 33 to provide a fluid seal between the underside of the race and the spindle 12.

The hub 14 is formed with an internal air chamber which represents a portion of an overall air path between the on-board automated system and the respective tire carried by the vehicle wheel end assembly. A sleeve 38 is disposed in a major portion of the volume between the hub cavity 36 and the outer surface of the spindle 12. The function of the sleeve 38 is to minimize abrasion of the components for example the rotary seal means, adjacent the spindle 12 against the out-board spindle threads 15 when the hub 14 is fitted onto or removed from the spindle. The sleeve 38 has a noninterfering relation to the passage of air within the volume it occupies.

Figure 3:
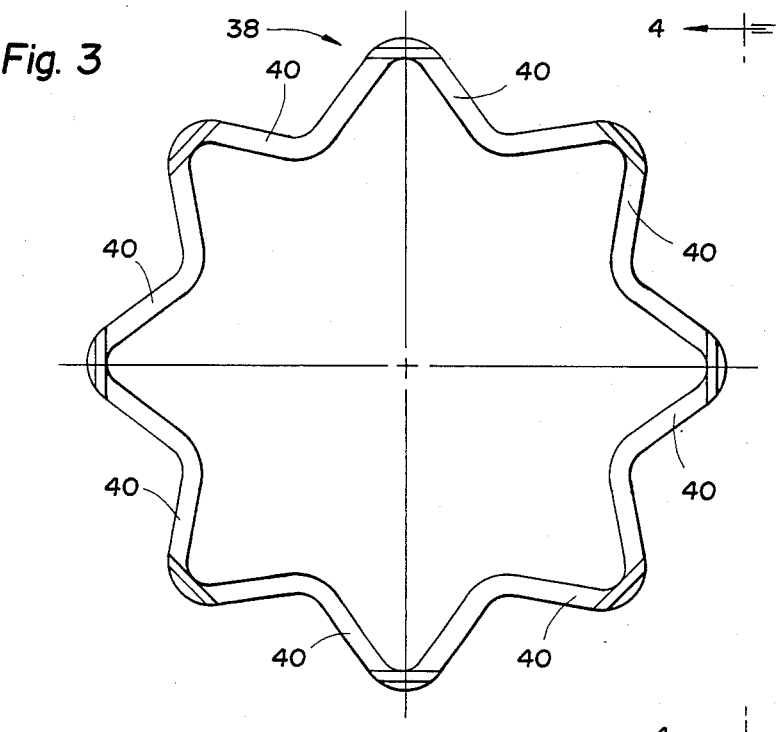
FIG. 3 is an end view of a sleeve mounted concentrically on the spindle to maintain spacing of the hub during installation and removal.
Figure 4:
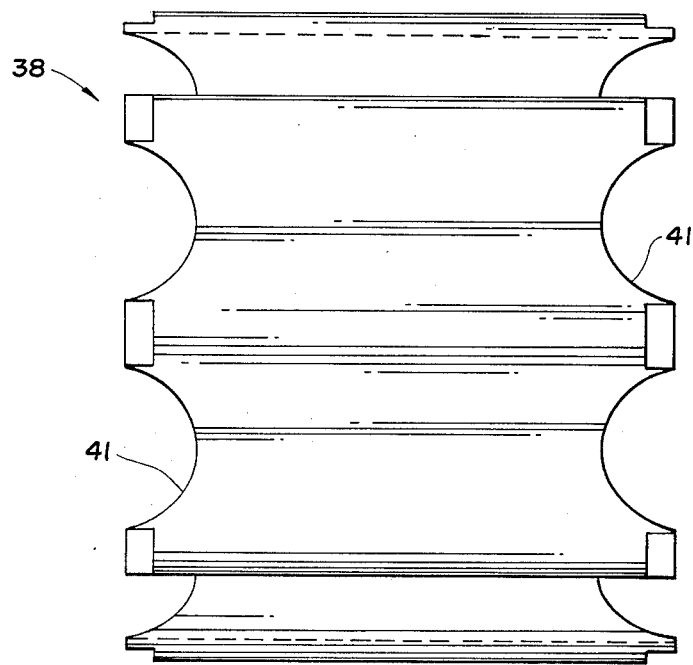
FIG. 4 is a side elevation view of the sleeve taken along line 4—4 of FIG. 3.

With reference in FIGS. 3 and 4, the sleeve 38 is shown in greater detail. It can be seen that the sleeve has a substantially cylindrical shape with radial surface undulations 40. The opposite ends of the sleeve 38 are formed with scallops 41 to permit radial flow of air with minimal obstructions.

Again with reference to FIG. 1, the environment of the bearing set 18 is sealed from foreign material by a dirt slinger 32 which includes a pair of fingers which bear against a ring 34 mounted concentrically on the inner race 26.

A feature of the present invention is the manner in which pressurized air is routed between the tire carried by the wheel end assembly 10 and the on-board system. In traversing this route in an outboard to inboard order, the air passage begins with an aperture 43 formed in an integral radial segment of the hub 14. The aperture 43 may be fitted with a hollow stud 42 or the like to facilitate connection to a conventional air line (not shown) outboard of the assembly 10.

A tube 47 is connected between the hollow stud 42 and a fitting 44. The fitting 44 has a threaded engagement with a tapped hole 45 formed in the hub 14.

The air path is continuous through the internal chamber 36 in the hub 14 to a passage 46 formed in the inner race 26 of the inboard bearing set 18. The air passage 46 is ported generally inboard of the hub 14 and connected to an adapter 48. The adapter 48 is in turn connected to one end of a tube 54 through a conventional fitting 50. The other end of the tube 54 is connected to one side of an elbow 56. The other side of the elbow is connected to a fitting 58 mounted on a chassis member 64. From this point the air can be routed to the on-board system in a conventional manner.

The air passage just described is sealed in the environment of the hub chamber 36 by a pair or rotary seals indicated generally at 60 and 62. The seal 60 is mounted in fixed relation to the outer bearing race 22 in cooperation with the hub 14 and has a sealed contact with an extension 66 of the inner race 20.

Similarly, the rotary seal 62 is mounted in fixed relation to the outer race 28 of bearing set 18 with the cooperation of the hub 14, and has a sealed contact with an extension 68 of the inner race 26.

Figure 2:
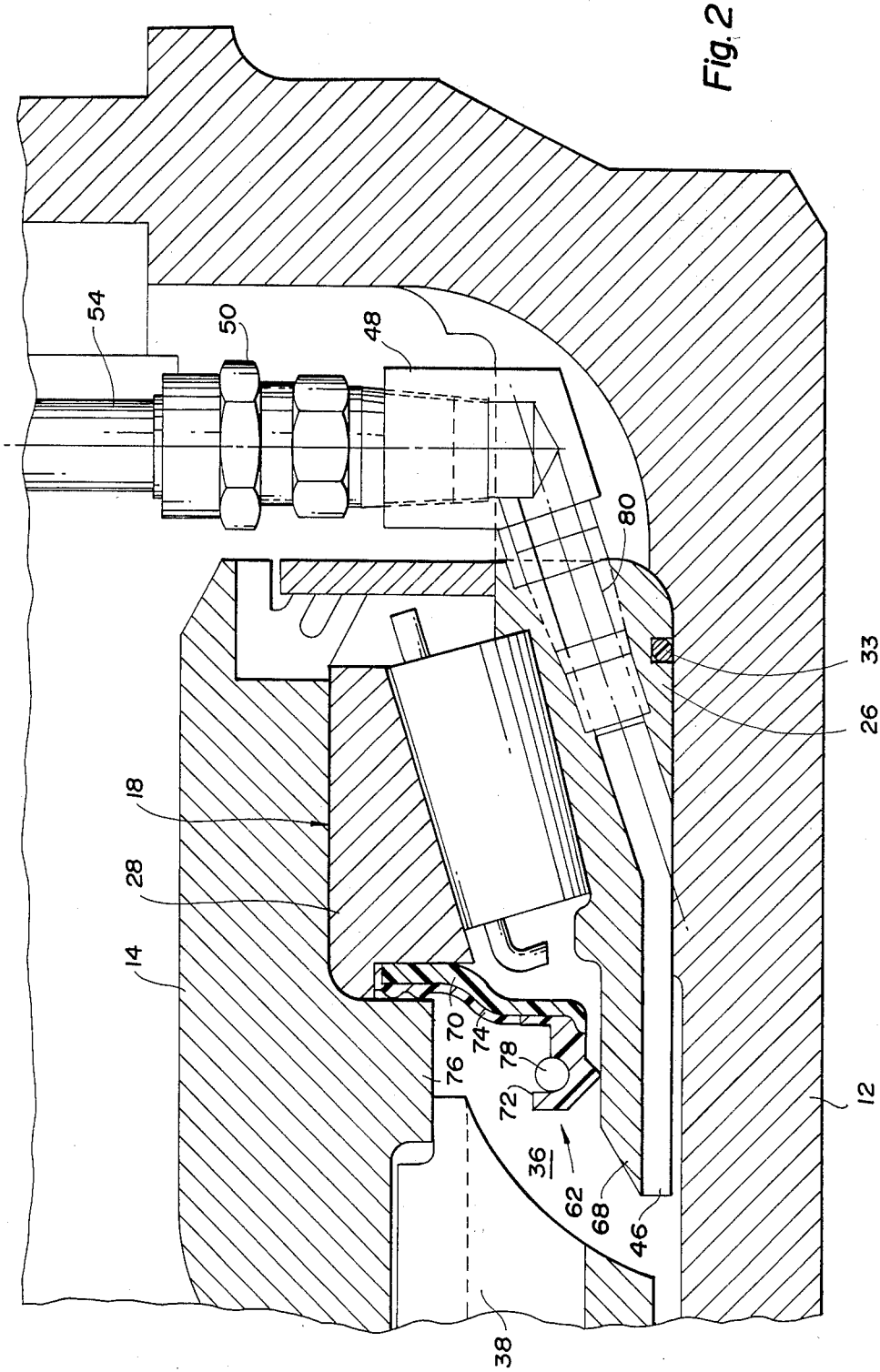
FIG. 2 is an enlarged view of a portion of the wheel end assembly of FIG. 1 illustrating the sealed air passage between the rotational and non-rotational members in greater detail.

FIG. 2 illustrates in greater detail the localized area of the inboard bearing set 18.

The inner, non-rotational race 26 is shown mounted on the spindle 12 and sealed there against by the O-ring 33.

The rotary seal assembly 62 comprises several constituents described as follows. A generally radially extending flange portion 70 is mated with a reinforcing segment 74 and mounted in a notch formed in the internal face of the outer race 28. The flange 70 and reinforcing member 74 are held in fixed position relative to the outer race 28 with the cooperation of a dependent shoulder 76 of the hub 14.

The radial flange 70 is connected to a lip segment 72 formed of low friction material which contacts the extension 68 of the inner race 26. A garter spring 78 provides a radial inward force to hold the lip 72 into sealed contact with the extension 68 of the inner race 26. The air passage 46 through the inner race 26 thereby communicates with the hub chamber 36 and is sealed at the inboard end by the action of the rotary seal assembly 62.

The air passage 46 is ported at its inboard end through a threaded fitting 80 which couples to the adapter 48. As previously described in reference to FIG. 1, the adapter receives a fitting 50 which is in turn connected to a tube 54.

Figure 5:
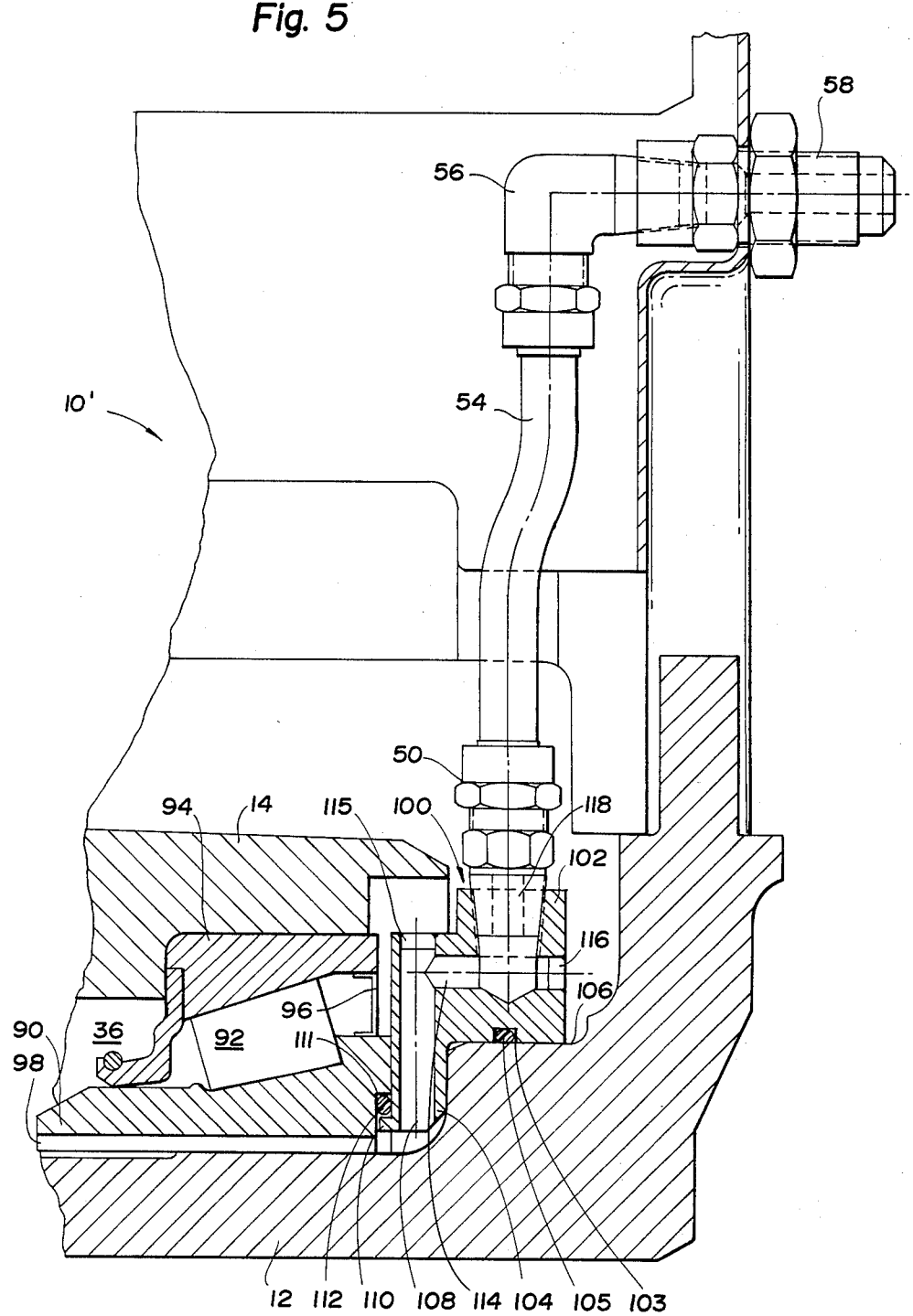
FIG. 5 is an enlarged sectional view of an alternative embodiment of the wheel end assembly featuring an inboard collar which mounts on the spindle and interconnects the air passage in the inner bearing race to air lines which extend to the on-board system.

FIG. 5 is an alternative embodiment of a vehicle wheel end assembly, indicated generally at 10', of the present invention. In description of FIG. 5, like reference numerals will be used for members common to the embodiments of FIGS. 1 and 5.

The vehicle wheel end assembly 10' similarly includes a spingle 12 and a hub 14 mounted for rotation on the spindle. The hub 14 is supported for rotation at the inboard end by a bearing set which includes an inner race 90 associated with the spindle, and an outer race 94 which is co-rotational with the hub 14. A roller bearing 92 is disposed between the inner race 90 and the outer race 94.

An annular dust seal 96 having a channel-shaped cross section is press fit into the radial gap between the inner race 90 and the outer race 94 rearward of the roller bearing 92.

The inner race 90 is formed with an axially extending air passage 98 to communicate the chamber 36 between the spindle 12 and the hub 14 with a collar, indicated generally at 100. The collar 100 is positioned inboard of the bearing set and mounted concentrically on the spindle.

The collar 100 includes an annular body 102 and an integral flange 104 which extends radially inward from the body.

The annular body 102 is seated on a step 106 on the spindle 12. An annular groove 103 is formed in the inner radial surface of the body 102 and seats on O-ring 105 to seal the collar 100 against the spindle 12.

The inward radial flange 104 includes a lip 110 which cooperates with a notch 111 formed in the inboard axial face of the race 90 to seat and seal another O-ring 112.

The collar 100 communicates with the axially extending passage 98 in the inner race 90 through a radially bore 108. The outer opening of the bore 108 is closed by a plug 115. An axial bore 114 continues the air path with the radial bore 108. The inboard end of the axial bore 114 is closed by a plug 116. A second radial bore 118 continues the air path to an air line which extends to the on-board system. The second radial bore 118 is threaded to receive the fitting 50. As previously described in connection with FIG. 2, the fitting 50 connects through tube 54, elbow 56 and fitting 58 to continue the air path toward the on-board automated system.

Although the invention has been shown and described in specific embodiments it is to be understood that modifications to the disclosed designs may be made without departing from the scope of the following claims.

I claim:

1. A vehicle wheel end assembly adapted for use with an automated system for controlling tire pressurization comprising:

a spindle mounted in fixed relation to the vehicle;

a hub mounted for rotation on the spindle and having an internal chamber adapted to form at least a portion of an air path between the automated system and the respective tire;

bearing means disposed in operative position between the spindle and the hub;

rotary seal means for communicating the internal chamber in the rotational hub to an adjacent inboard portion of the air path in a non-rotational member, said rotary seal means being positioned in fixed relation to said bearing means; and wherein the bearing means comprises first and second axially spced bearing sets, each having an inner race and an outer race, and at least one of said races includes means for locating and seating the rotary seal means.

2. The wheel end assembly of claim 1 wherein the rotary seal means includes first and second sealing rings, each ring having a flange portion, and further wherein said at least one race is shaped with a locating notch to locate and seat a respective flange portion of said sealing ring.

3. The wheel end assembly of claim 2 wherein the outer race of at least one of said first and second bearing sets is shaped with the locating notch and wherein the inner race of the inboard bearing set includes an air passage in fluid communication with the internal hub chamber.

4. The wheel end assembly of claim 3 wherein the air passage extends generally axially through the inner race.

5. The wheel end assembly of claim 3 wherein each outer race has a generally radially extending face directed toward the hub chamber and the locating notch is shaped in said radial face.

6. The wheel end assembly of claim 2 wherein each of the inner races of the bearing sets has an axial extension directed toward the hub chamber, and each of the sealing rings has a lip contacting the respective axial extension in sealed relation thereto.

7. The wheel end assembly of claim 6 wherein the lip is secured in sealed relation to the axial extension by biasing means.

8. The wheel end assembly of claim 7 wherein the biasing means comprises a garter spring.

9. The wheel assembly of claim 1, wherein the hub is cooperative to secure the rotary seal means in fxied relation to said bearing means.

10. A vehicle wheel end assembly adapted for use with an automated system for controlling tire presurization comprising:
- a spindle;
- a hub mounted for rotation on the spindle and having an internal chamber adapted to form part of an air path between the automated system and the respective tire; and
- bearing means disposed in operative position between the spindle and the hub, said bearing means having an internal air passage opening at one end to the hub chamber and opening at the the other end generally inboard of the hub in continuation of the airpath to the automated system.

11. The wheel end assembly of claim 10 wherein the bearing means includes a bearing set disposed generally inboard of the hub chamber and having an non-rotating member with the internal air passage formed therein.

12. The wheel end assembly of claim 11 wherein the bearing set includes a rotational outer race associated with the hub and a non-rotational inner race asociated with the spindle, and further wherein the internal air passage is formed within the inner race.

13. The wheel end assembly of claim 10 further comprising rotary seal means associated with the hub and the spindle for providing sealed fluid communication of the internal hub chamber with the internal air passage of the bearing means.

14. The wheel end assembly of claim 13 wherein each rotary seal means is mounted in fixed relation to the bearing means.

15. The wheel end assembly of claim 14 wherein the hub is cooperative to secure the rotary seal means in fixed relation to the bearing means.

16. A vehicle wheel end assembly adapted for use with an automated system for controlling tire pressurization comprising:
- a spindle mounted in fixed relation to the vehicle;
- a hub mounted for rotation on the spindle and having an internal chamber adapted for forming part of an air path between the automated system and the respective tire;
- bearing means disposed in operative position between the spindle and the hub, said bearing means having an internal air passage opening at one end to the hub chamber and at the other end generally inboard of the hub; and
- a collar mounted concentrically on the spindle and having an internal air passage extending between a first port, which communicates with the other end opening of the bearing internal air passage, and a second port, which communicates with the automated system.

17. The wheel end assembly of claim 16 wherein the collar comprises an annular body having an inward radial flange.

18. The wheel end assembly of claim 17 wherein the radial flange is integral with the annular body.

19. The wheel end assembly of claim 17 wherein the spindle has a radial step inboard of the hub which seats the annular body of the collar.

20. The wheel end assembly of claim 19 wherein the inward radial flange is positioned outboard of the radial step.

21. The wheel end assembly of claim 17 wherein the first port is formed in the inner surface of the flange and the second port is formed in the outer surface of the annular body.

22. The wheel end assembly of claim 16 further comprising sealing means for sealing the communication of the first port with the other end opening of the bearing internal air passage.

23. The wheel end assembly of claim 22 wherein the sealing means comprises first and second O-rings disposed in sealing relation among the bearing means, the spindle, and the collar.

24. A vehicle wheel end assembly adapted for use with an automated system for controlling tire pressurization comprising:
- a spindle mounted in fixed relation to the vehicle;
- a hub mounted for rotation on the spindle and having an internal chamber adapted to form part of an air path between the automated system and the respective tire;
- rotary seal means mounted in cooperation with said hub and extending radially inward therefrom in sealed relation to the spindle; and
- spacer means disposed in the hub chamber for maintaining substantially concentric positioning of the hub during movement of the hub relative to the spindle to avoid abrasion of the rotary seal means.

25. The wheel end assembly of claim 24 wherein the spacer means is mounted concentrically relative to the spindle.

26. The wheel end assembly of claim 25 wherein spacer means has a substantially cylindrical shape with a radially undulating surface.

27. The invention as defined in claim 25 wherein said spacer means has a substantially cylindrical shape with axially extending scallops.

* * * * *

UNITED STATES PATENT AND TRADEMARK OFFICE
CERTIFICATE OF CORRECTION

PATENT NO. : 4,730,656

DATED : March 15, 1988

INVENTOR(S) : Fred L. Goodell and Michael J. Ellison

It is certified that error appears in the above-identified patent and that said Letters Patent is hereby corrected as shown below:

IN THE ABSTRACT - "ABSTRACT" should be changed to --ABSTRACT OF THE DISCLOSURE--

IN THE SPECIFICATION: Column 2, line 25 "of" should be deleted and --or-- should be substituted therefor.

IN THE CLAIMS:

Column 4, line 65, "spced" should be deleted and --spaced-- should be substituted therefor.

Column 5, line 31, "fxied" should be deleted and --fixed-- should be substituted therefor.

Column 5, line 50, "an" should be deleted and --a-- should be substituted therefor.

UNITED STATES PATENT AND TRADEMARK OFFICE
CERTIFICATE OF CORRECTION

PATENT NO. : 4,730,656

DATED : March 15, 1988

INVENTOR(S) : Fred L. Goodell and Michael J. Ellison

It is certified that error appears in the above-identified patent and that said Letters Patent is hereby corrected as shown below:

Column 5, line 54, "asociated" should be deleted and --associated-- should be substituted therefor.

Signed and Sealed this

Twenty-third Day of August, 1988

Attest:

DONALD J. QUIGG

Attesting Officer

Commissioner of Patents and Trademarks